United States Patent
Itaya (10) Patent No.: US 11,353,908 B2
(45) Date of Patent: Jun. 7, 2022

(54) CENTRALIZED VOLTAGE CONTROL APPARATUS AND CENTRALIZED VOLTAGE CONTROL SYSTEM

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 150 days.

(21) Appl. No.: 16/963,593

(22) PCT Filed: Feb. 5, 2018

(86) PCT No.: PCT/JP2018/003878
§ 371 (c)(1),
(2) Date: Jul. 21, 2020

(87) PCT Pub. No.: WO2019/150586
PCT Pub. Date: Aug. 8, 2019

(65) Prior Publication Data
US 2021/0064073 A1  Mar. 4, 2021

(51) Int. Cl.
*G05F 1/66* (2006.01)
*H02J 13/00* (2006.01)
(Continued)

(52) U.S. Cl.
CPC ............. *G05F 1/66* (2013.01); *G05F 1/14* (2013.01); *G05F 1/70* (2013.01); *H02J 3/12* (2013.01);
(Continued)

(58) Field of Classification Search
CPC ...... G05F 1/66; G05F 1/14; G05F 1/70; H02J 3/12; H02J 3/18; H02J 13/00016;
(Continued)

(56) References Cited

U.S. PATENT DOCUMENTS 9,257,845 B2 * 2/2016 Alonso Sadaba ..... H02J 3/1885
10,345,842 B2 * 7/2019 Itaya ........................ G05F 1/66
(Continued)

FOREIGN PATENT DOCUMENTS

JP  H11289663 A  10/1999
JP  2011250629 A  12/2011
(Continued)

OTHER PUBLICATIONS

Office Action dated May 19, 2021, for corresponding Indian patent Application No. 202047032094, 5 pages.
(Continued)

*Primary Examiner* — Ziaul Karim
(74) *Attorney, Agent, or Firm* — Buchanan Ingersoll & Rooney PC (57) ABSTRACT

A centralized voltage control apparatus is connected via a communication network to a plurality of local voltage control devices each controlling a corresponding voltage controller connected to a distribution line of a distribution system. The centralized voltage control apparatus includes: a voltage distribution determination unit that calculates a control variable for each of the voltage controllers on the basis of a measured value of voltage at each measurement point of the distribution line and a proper voltage range at each measurement point; and a tap position determination unit that gives a command value to each of the local voltage control devices on the basis of the control variable. At least a part of the proper voltage range at each measurement point is determined on the basis of an estimated value of a change in voltage in a section in which voltage is not measured on the distribution line.

5 Claims, 7 Drawing Sheets

(51) Int. Cl.
  *G05F 1/14*   (2006.01)
  *G05F 1/70*   (2006.01)
  *H02J 3/12*   (2006.01)
  *H02J 3/18*   (2006.01)

(52) U.S. Cl.
  CPC .......... *H02J 3/18* (2013.01); *H02J 13/00016* (2020.01); *H02J 13/00034* (2020.01)

(58) Field of Classification Search
  CPC .......... H02J 13/00034; H02J 13/00002; Y02E 40/70; Y02E 60/00; Y04S 10/22; Y04S 10/30; Y04S 40/124
  See application file for complete search history.

(56) References Cited

U.S. PATENT DOCUMENTS

| | | | |
|---|---|---|---|
| 2014/0288725 A1* | 9/2014 | Itaya | ..................... H02J 3/00 700/298 |
| 2015/0005979 A1 | 1/2015 | Itaya | |
| 2015/0069978 A1 | 3/2015 | Watanabe et al. | |
| 2015/0142187 A1* | 5/2015 | Yamane | ................. G05B 15/02 700/286 |
| 2017/0122991 A1* | 5/2017 | Aki | ....................... G01R 21/001 |
| 2018/0076622 A1* | 3/2018 | Wilkins | .................... H02J 3/16 |

FOREIGN PATENT DOCUMENTS

| | | |
|---|---|---|
| JP | 5389303 B1 | 1/2014 |
| JP | 2014087184 A | 5/2014 |
| JP | 2014093804 A | 5/2014 |
| JP | 2014230436 A | 12/2014 |
| WO | 2013157209 A1 | 10/2013 |

OTHER PUBLICATIONS

International Search Report (PCT/ISA/210) dated Feb. 27, 2018, by the Japan Patent Office as the International Searching Authority for International Application No. PCT/JP2018/003878.

Notification of Reason for Refusal of JP Patent Application No. 2018-535078 dated Aug. 7, 2018.

Written Opinion (PCT/ISA/237) dated Feb. 27, 2018, by the Japan Patent Office as the International Searching Authority for International Application No. PCT/JP2018/003878.

\* cited by examiner

| MEASURING DEVICE | UPPER LIMIT VALUE | LOWER LIMIT VALUE |
|---|---|---|
| 10-1 | 107V | 101V |
| 10-2 | 107V | 101V |
| 10-3 | 107V | 101V |
| ⋮ | ⋮ | ⋮ |

FIG.10

| MEASURING DEVICE | UPPER LIMIT VALUE | LOWER LIMIT VALUE |
|---|---|---|
| 10-1 | 107V | 101.2V |
| 10-2 | - | - |
| 10-3 | 107V | 101V |
| ⋮ | ⋮ | ⋮ |

FIG.11

CENTRALIZED VOLTAGE CONTROL APPARATUS AND CENTRALIZED VOLTAGE CONTROL SYSTEM

FIELD

The present invention relates to a centralized voltage control apparatus and a centralized voltage control system for controlling voltage of a power system.

BACKGROUND

A distribution system typically includes a high voltage system and a low voltage system, where a typical customer is connected at its receiving end to the low voltage system. An electric utility is obligated to maintain the voltage at the receiving end of the typical customer within a proper voltage range. When supplying power at 100 V, for example, the electric utility is obligated to maintain the voltage between 95 V and 107 V. The electric utility thus maintains the voltage at the receiving end of the typical customer by regulating a control variable of a voltage controller connected to the high voltage system. Note that in the following description, the distribution system refers to the high voltage system unless otherwise specified.

In conventional voltage control of the distribution system, a local voltage control device is widely available to perform autonomous decentralized voltage control on the voltage controller on the basis of measured information obtained near the installation site of the voltage controller. The local voltage control device is integrated with the voltage controller or installed alongside the voltage controller.

Meanwhile, in recent years, a method that performs centralized control (hereinafter referred to as a centralized control method) on the voltage of the distribution system to achieve consistency across the system has been proposed in place of the autonomous decentralized voltage control method. In the centralized control method, a centralized voltage control apparatus calculates an amount of adjustment for the voltage controller on the basis of a measured value of the voltage at each point in the distribution system such that the voltage at each point in the distribution system is maintained within a proper voltage range. For example, Patent Literature 1 discloses a technique in which a central unit servings as the centralized voltage control apparatus calculates an amount of adjustment for a local device serving as the voltage controller in the distribution system, and transmits the amount of adjustment as a control signal to each local device.

CITATION LIST

Patent Literature

Patent Literature 1: Japanese Patent Application Laid-open No. H11-289663

SUMMARY

Technical Problem

For the centralized voltage control apparatus in the above related art, control is based on the measured voltage. As a result, the voltage may deviate from the proper voltage range at a site where the voltage is not measured. Unfortunately, it is not easy to increase the number of measuring devices for measuring the voltage of the distribution system, and it is expected to take time before a sufficient number of measuring devices are installed. Also, the installed measuring device may become unusable due to a failure or the like. Moreover, some of the installed measuring devices may become unusable at the time of switching the system. For this reason, the prior art poses a problem of a possible deviation of the voltage from the proper voltage range at a site where no measuring device is installed or where the measuring device is unusable.

The present invention has been made in view of the above, and an object of the present invention is to provide a centralized voltage control apparatus that can prevent a deviation of voltage from a proper voltage range.

Solution to Problem

In order to solve the above problem and achieve the object, according to the present invention, there is provided a centralized voltage control apparatus connected via a communication network to a plurality of local voltage control devices to control, in a one-to-one correspondence, a plurality of voltage controllers to control voltage of a distribution line of a distribution system, the voltage controllers being connected to the distribution line, the centralized voltage control apparatus comprising: a calculation unit to calculate a control variable for each of the plurality of voltage controllers on the basis of a measured value of voltage at each measurement point of the distribution line and a proper voltage range at each measurement point; and a command unit to give a command value to each of the plurality of local voltage control devices on the basis of the control variable. At least a part of the proper voltage range at each measurement point is determined on the basis of an estimated value of a change in voltage in a section in which voltage is not measured on the distribution line.

Advantageous Effects of Invention

The centralized voltage control apparatus according to the present invention has an effect of preventing the deviation of voltage from the proper voltage range.

DESCRIPTION OF EMBODIMENT

A centralized voltage control apparatus and a centralized voltage control system according to an embodiment of the present invention will now be described in detail with reference to the drawings. Note that the present invention is not limited to the embodiment.

Embodiment

Figure 1:
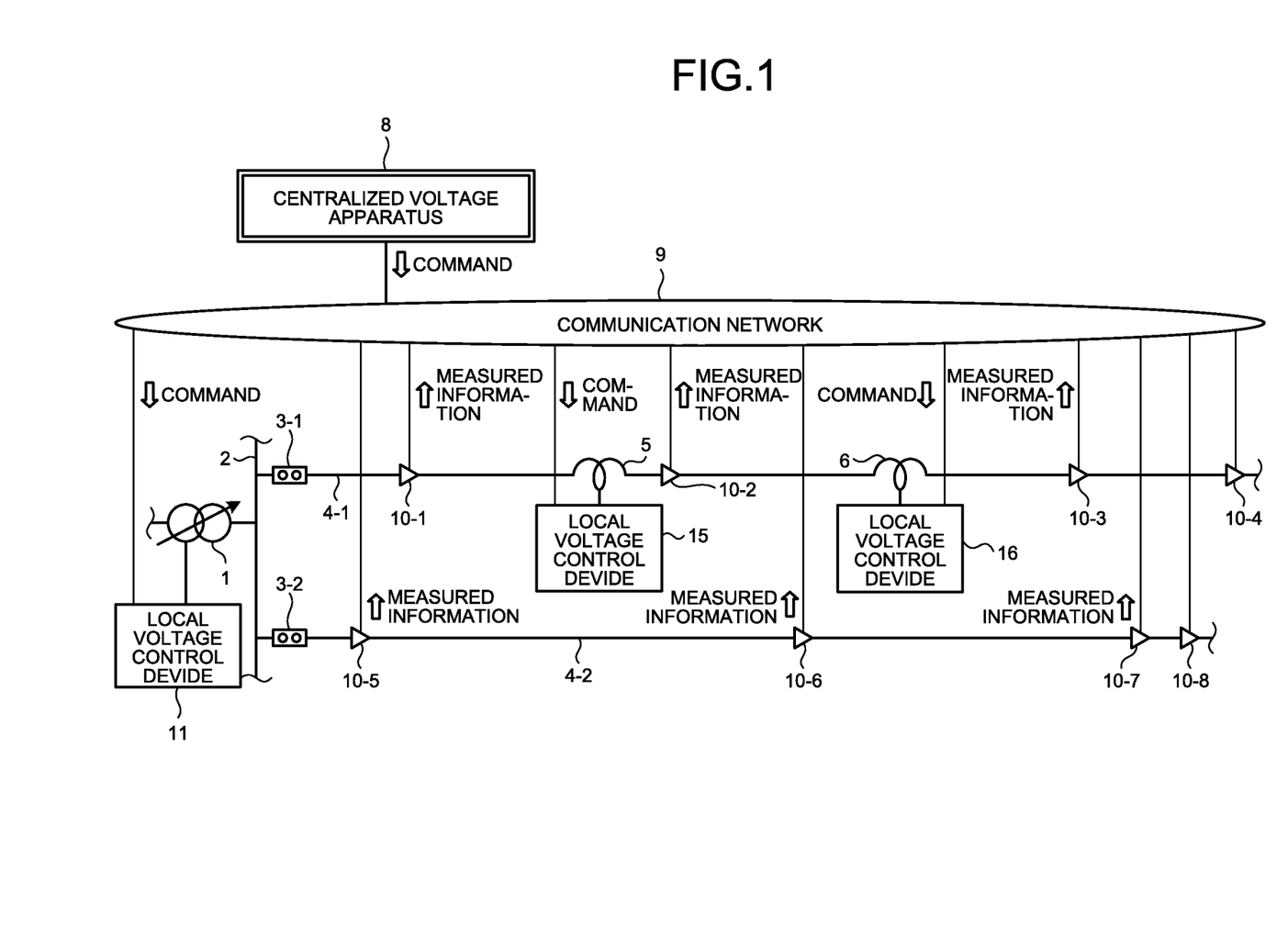
FIG. 1 is a diagram illustrating an example of the configuration of a centralized voltage control system according to an embodiment of the present invention.

FIG. 1 is a diagram illustrating an example of the configuration of a centralized voltage control system according to an embodiment of the present invention. A voltage controller 1 in FIG. 1 is of a transformer type and is, for example, a load ratio control transformer (LRT) as a distribution transformer installed in a substation. A local voltage control device 11 is connected to the voltage controller 1 and controls the voltage controller 1. The voltage controller 1 will be hereinafter also referred to as an LRT 1. The local voltage control device 11 can be installed in integration with or alongside the voltage controller 1. The local voltage control device 11 controls the voltage controller 1 by adjusting a control variable of the voltage controller 1, specifically, by adjusting a tap position thereof. The local voltage control device 11 also includes a communication function and is connected to a communication network 9.

A bus 2 is connected to a secondary side of the voltage controller 1. Two distribution lines 4-1 and 4-2 are connected in parallel to the bus 2. The distribution lines 4-1 and 4-2 are distribution lines of a high voltage system.

One end of the distribution line 4-1 is connected to the bus 2 via a circuit breaker 3-1. On the distribution line 4-1, measuring devices 10-1, 10-2, 10-3, and 10-4 are installed to measure the voltage and power flow of the distribution line 4-1. The power flow measured by the measuring devices 10-1, 10-2, 10-3, and 10-4 is, for example, active power and reactive power. Although the description below is made on the assumption that the measuring devices 10-1, 10-2, 10-3, and 10-4 are switches with sensors, the measuring devices are not limited to the switches with sensors but may be measuring devices that do not have the function of a switch. Each of the measuring devices 10-1, 10-2, 10-3, and 10-4 is connected to the distribution line 4-1 and measures the voltage and power flow at the connection point therebetween. The measuring devices 10-1, 10-2, 10-3, and 10-4 each include a communication function and are connected to the communication network 9. The measuring devices 10-1, 10-2, 10-3, and 10-4 periodically transmit, for example, measured information, which is a result of measurement of the voltage and power flow, to a centralized voltage control apparatus 8 via the communication network 9. The measuring devices 10-1, 10-2, 10-3, and 10-4 transmit the measured information every minute, for example.

The centralized voltage control apparatus 8 determines a desired voltage distribution for a target system range, and an operating state of each voltage controller to achieve the desired voltage distribution, and gives a command value to each voltage controller. Note that the centralized voltage control apparatus 8 can be installed, for example, at a service office, or a control station that takes charge of the target system range.

Voltage controllers 5 and 6 are connected on the distribution line 4-1. The voltage controllers 5 and 6, which are voltage controllers of a transformer type, are step voltage regulators (SVRs). The voltage controller 5 is connected to a local voltage control device 15 that controls the voltage controller 5. The local voltage control device 15 can be installed in integration with or alongside the voltage controller 5. The local voltage control device 15 controls the voltage controller 5 by adjusting a control variable of the voltage controller 5, specifically, by adjusting a tap position thereof. Likewise, the voltage controller 6 is connected to a local voltage control device 16 that controls the voltage controller 6. The local voltage control device 16 controls the voltage controller 6. The local voltage control devices 15 and 16 also include a communication function and are connected to the communication network 9.

One end of the distribution line 4-2 is connected to the bus 2 via a circuit breaker 3-2. As with the distribution line 4-1, measuring devices 10-5, 10-6, 10-7, and 10-8 are installed at a plurality of points on the distribution line 4-2 to measure the voltage and power flow of the distribution line 4-2. Hereinafter, the measuring devices 10-1 to 10-8 will be referred to as the measuring devices 10 when not individually referred to.

Although not shown in FIG. 1, a low voltage distribution line is connected to each of the distribution lines 4-1 and 4-2 via a transformer called a pole transformer. The pole transformer converts voltage of the high voltage system to voltage of the low voltage system. The low voltage distribution line is connected to a load and a distributed power supply such as a generator including a solar power generator and a storage battery. However, the present embodiment can be applied even when the distributed power supply is not connected to the low voltage distribution line. Hereinafter, voltage control of the distribution system means voltage control of the high voltage system.

Note that although the two distribution lines are connected to the bus 2 in the example of configuration illustrated in FIG. 1, the number of distribution lines in the high voltage system is not limited to two. Moreover, the number of the voltage controllers installed and the number of the measuring devices 10 are not limited to those in the illustrated example. Also, although a voltage controller of a reactive power regulator type is not connected to the distribution lines 4-1 and 4-2 in the example of configuration illustrated in FIG. 1, the voltage controller of a reactive power regulator type may also be subjected to centralized voltage control by the centralized voltage control apparatus 8.

The centralized voltage control apparatus 8 is connected to each of the local voltage control devices 11, 15, and 16 and the measuring devices 10 via the communication network 9. The communication network 9 is a dedicated network, for example, and is provided for the purpose of monitoring and controlling the distribution system. That is, the centralized voltage control apparatus 8 is connected to the plurality of local voltage control devices via the communication network 9, the plurality of local voltage control devices each controlling a corresponding one of the plurality of voltage controllers connected to the distribution lines of the high voltage system, the voltage controllers controlling the voltage of the distribution lines. On the basis of measured information transmitted from the measuring devices 10, the centralized voltage control apparatus 8 determines, a centralized voltage control period, a control variable controlled by each of the local voltage control devices. The centralized voltage control apparatus 8 then individually provides a command of the determined control variable for each of the local voltage control devices via the communication network 9. That is, the centralized voltage control apparatus 8 individually transmits the determined control variable to each of the local voltage control devices via the communication network 9. The centralized voltage control apparatus 8 thus controls the voltage controllers controlling the voltage of the high voltage distribution lines. The centralized voltage control period may be set to any value, and is set to five minutes in the following description.

The centralized voltage control apparatus 8 determines the tap positions for the local voltage control devices controlling the voltage controllers of a transformer type. That is, the centralized voltage control apparatus 8 determines the tap positions for the local voltage control devices 11, 15, and 16 in the example of FIG. 1. Then, the centralized voltage control apparatus 8 gives command values on the basis of the determined tap positions. The command value given to the local voltage control device may be the tap position itself, or may be an amount of change from the current tap position. To control the voltage controller of a reactive power regulator type as well, the centralized voltage control apparatus 8 gives an amount of reactive power as the command value to the local voltage control device controlling the voltage controller of a reactive power regulator type. Details of the operation of the centralized voltage control apparatus 8 will be described later.

Figure 2:
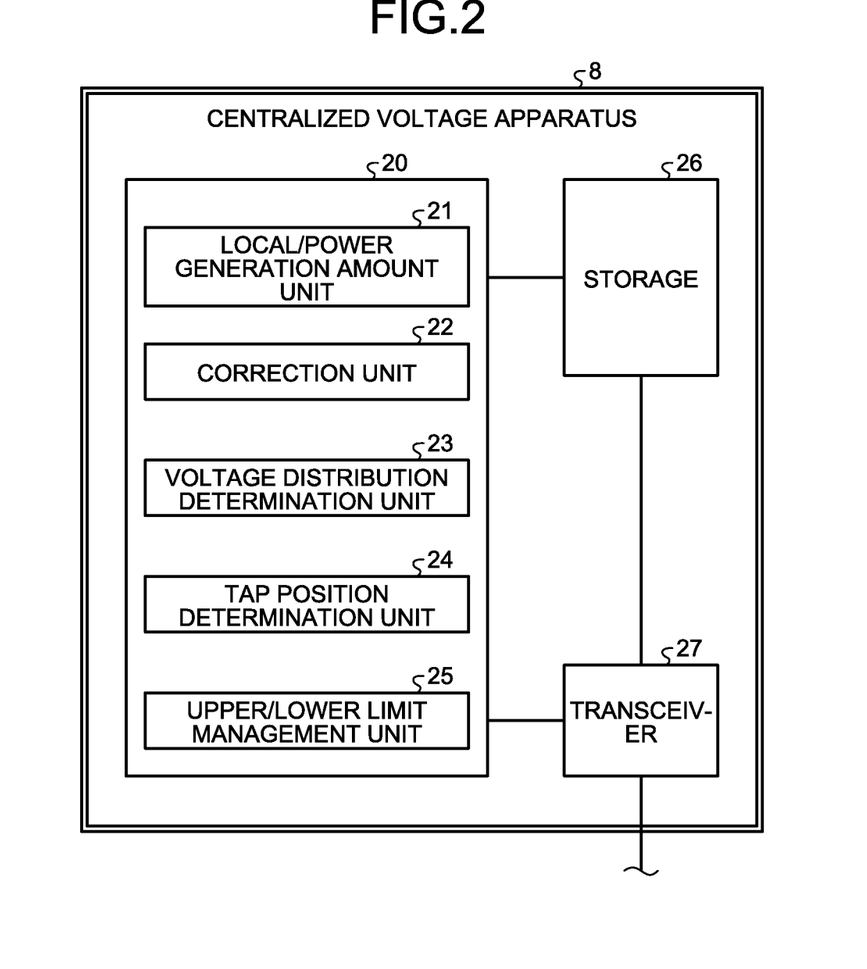
FIG. 2 is a diagram illustrating an example of the configuration of a centralized voltage control apparatus.

FIG. 2 is a diagram illustrating an example of the configuration of the centralized voltage control apparatus 8. As illustrated in FIG. 2, the centralized voltage control apparatus 8 includes a control section 20, a storage 26, and a transceiver 27. The transceiver 27 is connected to the communication network 9 and communicates with the local voltage control devices and the measuring devices 10. The transceiver 27 stores measured information received from the measuring devices 10 in the storage 26.

The control section 20 includes a load/power generation amount predicting unit 21, a correction unit 22, a voltage distribution determination unit 23, a tap position determination unit 24, and an upper/lower limit management unit 25. The load/power generation amount predicting unit 21 predicts a distribution of a load/power generation amount of the distribution system for a fixed period in the future such as the next day, and provides the predicted one as a profile for every hour, for example. The load/power generation amount corresponds to an amount obtained by subtracting the amount of power generation from a pure load. The load/power generation amount is the amount of load when taking a positive value, or is the amount of power generation when taking a negative value. Note that details of a method of predicting the load/power generation amount distribution will be described later. The correction unit 22 corrects a predicted value of the load/power generation amount distribution within a period of the centralized voltage control period on the basis of a result of comparison between an actual value of the load/power generation amount distribution within a period of the last centralized voltage control period and a predicted value of the load/power generation distribution within the period. Here, the actual value of the load/power generation amount distribution is calculated on the basis of the measured information.

The voltage distribution determination unit 23 calculates a power flow on the basis of the predicted value of the load/power generation amount distribution corrected, and uses the measured information stored in the storage 26 to search for the best solution that provides the best value of an evaluation function that evaluates the voltage distribution of the distribution system, such that the voltage distribution determination unit 23 determines an optimum voltage distribution within the period of the centralized voltage control period and an optimum control variable for each voltage controller. That is, the voltage distribution determination unit 23, which is a calculation unit, calculates the control variable for each of the plurality of voltage controllers on the basis of a measured value of voltage at each measurement point on the distribution line and a high-voltage proper voltage range at each measurement point. Note that the optimum voltage distribution is a voltage distribution at each point in the distribution system satisfying constraints and giving the optimum evaluation function. Each point in the distribution system means the site measured by the measuring device 10 on the distribution lines 4-1 and 4-2. The optimum control variable is a control variable transmitted to each voltage controller so as to achieve the optimum voltage distribution. The optimum control variable for the local voltage control device corresponding to the voltage controller of a transformer type is the tap position. Note that when the voltage controller of a reactive power regulator type is the target to control, the optimum control variable for the local voltage control device corresponding to the voltage controller of a reactive power regulator type is the amount of reactive power output by the voltage controller.

On the basis of the optimum voltage control variable, the tap position determination unit 24, which is a command unit, determines a command value for the local voltage control device corresponding to the voltage controller of a transformer type, and gives the determined command value to each local voltage control device via the transceiver 27. The command value is a value indicating the tap position in the case of the local voltage control device corresponding to the voltage controller of a transformer type.

The upper/lower limit management unit 25 manages the upper and lower limit values of the high-voltage proper voltage range at each measurement point in the distribution system. Hereinafter, the upper limit value and the lower limit value will also be collectively referred to as upper/lower limit values. The high-voltage proper voltage range, which is the proper voltage range of the high voltage system, is a range that maintains the voltage of the distribution lines 4-1 and 4-2 of the high voltage system determined such that the voltage at a receiving end of a typical customer connected to the low voltage distribution line can be maintained within a proper voltage range. In an initial state, the high-voltage proper voltage range is determined such that the voltage when converted to low voltage falls within a predetermined range, for example. The predetermined range is a range of 101 V to 107 V, for example. In the present embodiment, the upper limit value and the lower limit value of the high-voltage proper voltage range can each be changed on a measurement-point-by-measurement-point basis. A method of changing the upper limit value and the lower limit value of the high-voltage proper voltage range will be described later.

The storage 26 stores proper range information that is the upper/lower limit values of the high-voltage proper voltage range at each measurement point in the distribution system. The storage 26 also stores a control limit of each voltage controller connected to the distribution system.

Figure 3:
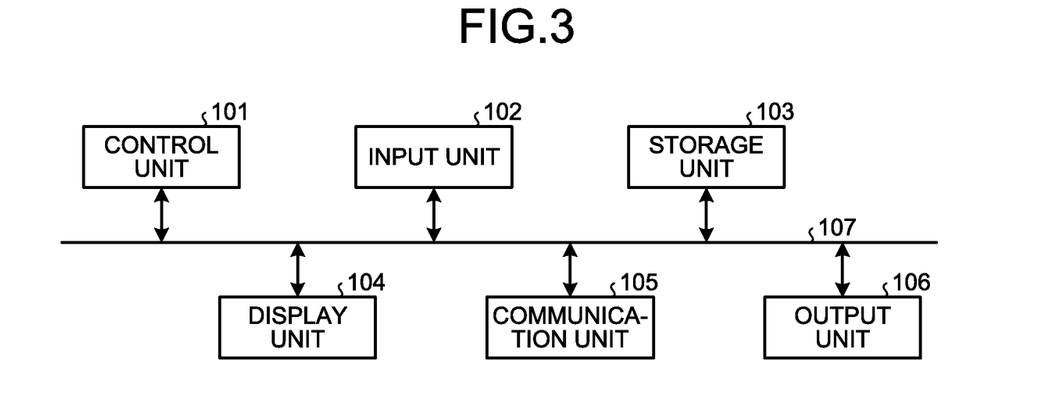
FIG. 3 is a diagram illustrating an example of the configuration of a computer system of the embodiment.

The centralized voltage control apparatus 8 is specifically a computer system, that is, a computer. The computer system functions as the centralized voltage control apparatus 8 when a centralized voltage control program is run on the computer system. FIG. 3 is a diagram illustrating an example of the configuration of the computer system of the present embodiment. As illustrated in FIG. 3, the computer system includes a control unit 101, an input unit 102, a storage unit 103, a display unit 104, a communication unit 105, and an output unit 106, which are connected via a system bus 107.

In FIG. 3, the control unit 101 is a processor such as a central processing unit (CPU), and executes the centralized voltage control program of the present embodiment. The input unit 102 includes a keyboard and a mouse, for example, and is used by a user of the computer system to input various information. The storage unit 103 includes various memories such as a random access memory (RAM) and a read only memory (ROM) as well as a storage device such as a hard disk, and stores a program to be executed by the control unit 101, necessary data obtained in the course of processing, and the like. The storage unit 103 is also used as a temporary storage area for the program. The display unit 104 includes a display, a liquid crystal display (LCD) panel, and the like and displays various screens to the user of the computer system. The communication unit 105 is a transmitter and a receiver that perform communication processing. The output unit 106 is an output port that can be connected to a printer or the like, for example. Note that FIG. 3 illustrates an example and does not limit the configuration of the computer system.

Here, a description will be given of an example of the operation of the computer system that renders the centralized voltage control program of the present embodiment executable. The centralized voltage control program is installed to the storage unit 103 of the computer system having the above configuration from, for example, a Compact Disc (CD)-ROM or a Digital Versatile Disc (DVD)-ROM set in a CD-ROM or DVD-ROM drive not shown. When executed, the centralized voltage control program read from the storage unit 103 is stored in the storage unit 103. In this state, the control unit 101 executes centralized voltage control processing of the present embodiment according to the program stored in the storage unit 103.

Note that although the present embodiment provides the program describing the centralized voltage control processing via the CD-ROM or DVD-ROM as a recording medium, the program may be provided for use through a transmission medium such as the Internet via the communication unit 105, for example, depending on the configuration of the computer system, the size of the program provided, and the like.

The control section 20 illustrated in FIG. 2 is implemented by the control unit 101 in FIG. 3. The storage 26 illustrated in FIG. 2 is a part of the storage unit 103 illustrated in FIG. 3. The transceiver 27 illustrated in FIG. 2 corresponds to the communication unit 105 illustrated in FIG. 3.

Figure 4:
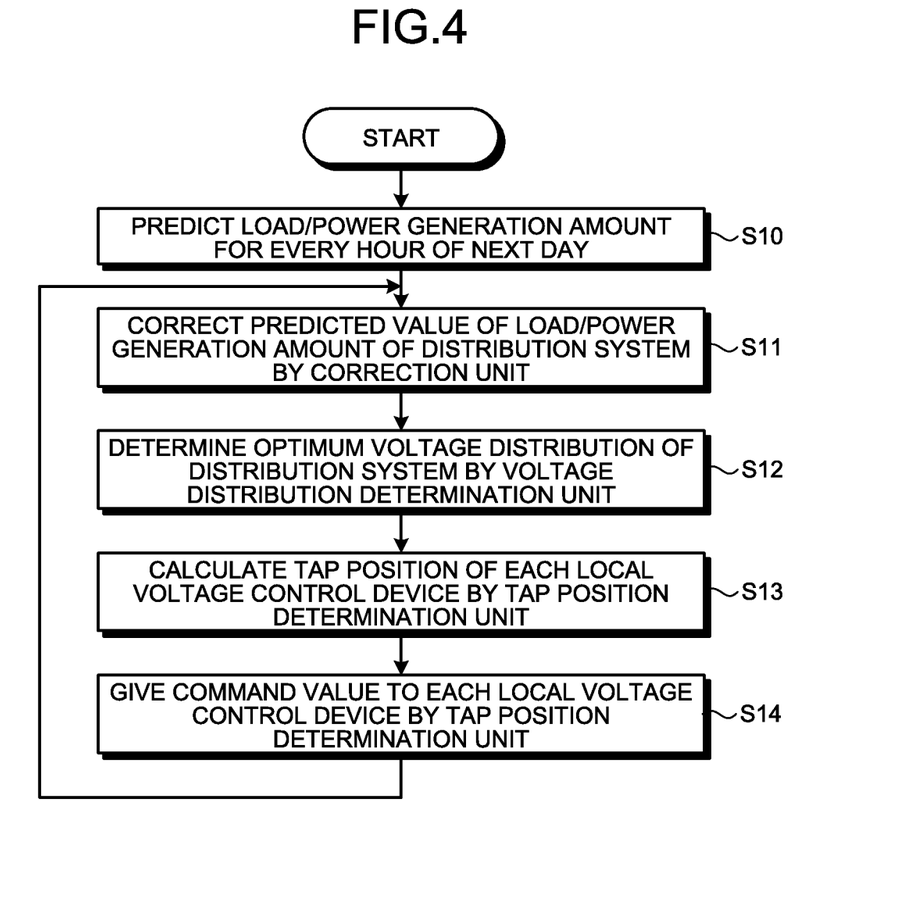
FIG. 4 is a flowchart illustrating an example of a centralized voltage control procedure.

Next, centralized voltage control by the centralized voltage control apparatus 8 of the present embodiment will be described. FIG. 4 is a flowchart illustrating an example of a centralized voltage control procedure of the present embodiment. In the present embodiment, a future load/power generation distribution of the distribution system is predicted every day. Note that although the load/power generation distribution of the distribution system in the future, namely the next day, is predicted every day in the example described herein, the future load/power generation distribution of the distribution system may be predicted, for example, every half day, or every few days, instead of every day.

As illustrated in FIG. 4, the load/power generation amount predicting unit 21 predicts, from load/power generation amount data at each point in the distribution system saved in the storage 26, the load/power generation amount distribution of the distribution system for, for example, every hour of the next day (step S10). Note that the load/power generation amount predicting unit 21 finds the load/power generation amount at each point in the distribution system by, for example, taking a difference in the average value of the power flow between adjacent measurement points, on the basis of measured information from the measuring devices 10 that is received in the past and stored in the storage 26. By finding the load/power generation amount for each point in the distribution system, the load/power generation amount predicting unit 21 predicts the load/power generation amount distribution. The load/power generation amount at each point in the distribution system is saved in the storage 26 as the load/power generation amount data. The load/power generation amount data is updated as appropriate on the basis of the measured information. The load/power generation amount data need not be calculated on the basis of the measured information but may be determined on the basis of a model that is calculated on the basis of, for example, equipment data indicating what equipment and load are disposed in what part of the distribution line, a contract demand corresponding to each load, and the panel capacity of solar power generation equipment.

The load/power generation amount predicting unit 21 collects an actual load for a plurality of days, for example, and obtains in advance a correlation between the amount of load and air temperature at the same time by day of the weak or by weekday/holiday. This correlation is held as a relational expression obtained by, for example, a regression analysis or a table. Then, from the correlation and a forecast temperature of the next day, the load/power generation amount predicting unit 21 predicts the amount of load at each point in the distribution system for every hour of the next day. Assuming that the power generation amount of the next day is theoretical power generation amount based on a weather forecast for the next day, the load/power generation amount predicting unit 21 subtracts the predicted power generation amount from the amount of predicted load to thereby create the load/power generation amount data at each point in the distribution system for every hour of the next day.

Next, the correction unit 22 corrects the predicted value of the load/power generation amount of the distribution system (step S11). Specifically, for an average value of the load/power generation amount at each point in the distribution system in a past fixed time period, the correction unit 22 compares a predicted value with an actual value calculated on the basis of the measured information received from the measuring device 10 in the most recent fixed time period, finds a ratio of the actual value to the predicted value, and multiplies a predicted value of the load/power generation amount in a future fixed time period by the ratio, thereby correcting the predicted value of the load/power generation amount at each point in the system in the future fixed time period. The fixed time period is the centralized voltage control period, for example.

Next, the voltage distribution determination unit 23 determines an optimum voltage distribution of the distribution system in the future fixed time period on the basis of the corrected predicted value of the load/power generation at each point in the distribution system (step S12), the corrected predicted value being provided in step S11. Note that the processing of correcting the predicted value of the load/power generation in step S11 may be omitted, in which case the voltage distribution determination unit 23 may determine the optimum voltage distribution of the distribution system in the future fixed time period on the basis of the predicted value of the load/power generation amount at each point in the distribution system for the next day created in step S10.

Next, the tap position determination unit 24 calculates a tap position serving as a command value given to each local voltage control device in the future fixed time period on the basis of tap information and the control variable, namely the optimum control variable (step S13). The optimum control variable is a basis for the calculation of the optimum voltage distribution of the distribution system.

The tap position determination unit 24 then gives the command value to each local voltage control device controlling the voltage controller (step S14), and the processing returns to step S11. Specifically, the tap position determination unit 24 transmits the command value to each local voltage control device via the transceiver 27. Steps S11 to S14 are repeated in each centralized voltage control period.

Figure 5:
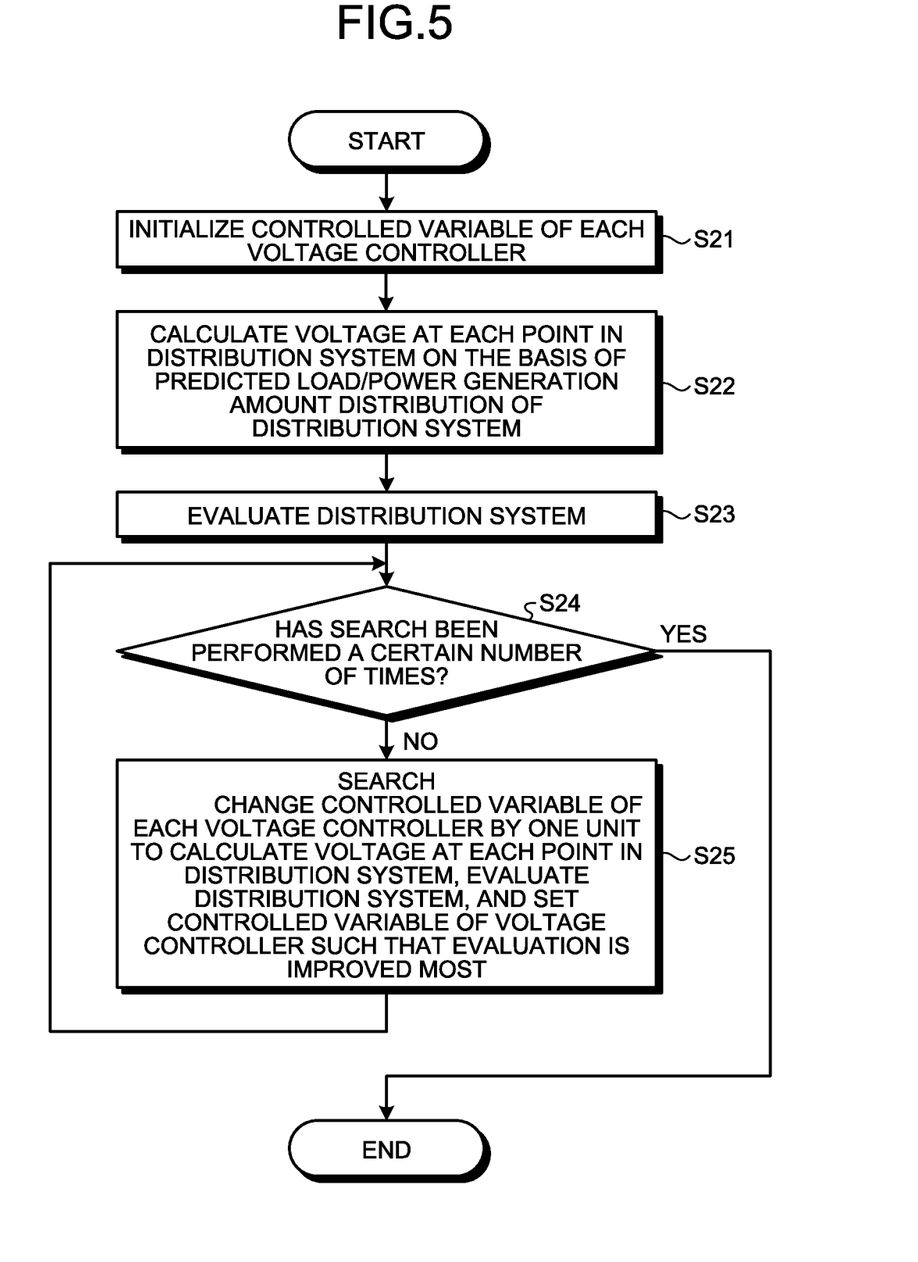
FIG. 5 is a flowchart for explaining details of processing in step S12 of FIG. 4.

Next, the details of the processing in step S12 of FIG. 4 will be described. FIG. 5 is a flowchart for explaining the details of the processing in step S12 of FIG. 4 and illustrates a flow for calculating the optimum voltage distribution of the distribution system in the future fixed time period.

First, the voltage distribution determination unit 23 initializes the control variable for each voltage controller (step S21). The initialized control variable, namely the tap position, may be a value predetermined as an initial position or a value previously commanded.

Note that when the voltage controller of a reactive power regulator type is the target to control as well, the voltage distribution determination unit 23 sets the control variable of each voltage controller to an initial value or the previous control variable in the initialization of step S21. The initial value of the reactive power of the voltage controller of a reactive power regulator type is zero, for example.

Next, the voltage distribution determination unit 23 calculates power flow with the set control variable of each voltage controller on the basis of the prediction of the load/power generation amount distribution, specifically the corrected predicted value of the load/power generation amount at each point in the distribution system, thereby calculating the voltage at each point in the distribution system (step S22). The corrected predicted value of the load/power generation amount is provided in step S11.

The voltage distribution determination unit 23 then evaluates the distribution system on the basis of a result of the power flow calculation (step S23). Specifically, the voltage distribution determination unit 23 evaluates the distribution system by evaluating a value of an objective function, that is, a value of the evaluation function set for an evaluation item of the distribution system. Here, the evaluation item given a first priority is an amount of violation, that is, an amount of deviation, of the voltage at each point in the distribution system from the high-voltage proper voltage range. That is, the optimum voltage distribution is determined to minimize a sum total of the amount of violation of the voltage at each point in the distribution system from the proper voltage range in the first place.

The evaluation item given a second priority is, for example, a voltage margin at each point in the distribution system, that is, an amount of margin with respect to the upper/lower limit values of the high-voltage proper voltage. When each point in the distribution system has a small voltage margin, a slight voltage fluctuation causes the voltage to deviate from the proper voltage range, which results in the voltage controller coming into operation frequently. Such a frequent operation of the voltage controller changes the tap position frequently, which may result in a decrease in the life of the voltage controller. Also, when the voltage margin is small, the voltage may deviate from the proper voltage range in the event of a short-term fluctuation of the voltage by solar power generation equipment or the like. Thus, the larger the sum total of the voltage margin, the higher the evaluation. In the case of using an evaluation function that is optimal when taking the minimum value, that is, an evaluation function indicating that the smaller the value, the greater the properness, the voltage margin is evaluated by using a voltage margin decrease defined as follows. The voltage margin decrease is calculated using the following expression (1) in which the voltage margin decrease is zero when the voltage margin is sufficiently large, the voltage margin decrease becomes greater as the voltage margin decreases.

$$\text{Voltage margin decrease} = \text{threshold} - \text{voltage margin},$$
$$\text{where voltage margin} < \text{threshold}$$

$$\text{Voltage margin decrease} = 0, \text{ where voltage margin} >= \text{threshold} \quad (1)$$

The threshold is set in the initialization of step S21, for example. The threshold is set to, for example, about 20% of the extent of the proper voltage range.

The case where the voltage margin<threshold holds and the voltage value is within the proper voltage range does not result in a deviation from the proper voltage range, that is, a voltage violation, but results in a voltage margin violation, that is, a failure to secure the voltage margin for a short-term fluctuation. Thus, the voltage margin>=threshold is desired.

The evaluation item given a third priority can be a sum total of a change of the control variable of the voltage controller from an initially set value. Here, the change of the control variable of the voltage controller from the initially set value is a difference in the tap position from an initially set tap position in the case of the voltage controller of a transformer type. Reduction in the sum total of the change leads to reduction in the number of times the voltage controller is operated.

The evaluation item given a fourth priority can be a transmission loss (active power loss+reactive power loss) of the entire distribution system. The smaller the transmission loss, the higher the evaluation. Note that the transmission loss is mostly the active power loss and decreases as the voltage increases, in which case, however, the voltage margin on the side of the upper limit value at each point in the distribution system given the second priority becomes smaller accordingly. Thus, the transmission loss is the meaningful evaluation item when the upper/lower voltage limit values at each point in the distribution system have considerable margins.

The evaluation function may be set for the evaluation item given the first priority only, or can be set for two or more of the items given the first to fourth priorities. In this case, the evaluation functions are weighted and totaled to thereby provide an overall evaluation function. A higher priority item can also be included in the evaluation function, depending on the distribution system. The evaluation function can be constructed to be most optimized (highly evaluated) when taking the minimum value, for example.

When the evaluation function is set on the basis of all the evaluation items given the first to fourth priorities, for example, the evaluation function can be defined as the following expression (2). In the expression, characters "Wp", "W1", "W2", and "W3" are weighting factors.

Evaluation function value=sum total of amount of violation of upper/lower voltage limits at each point in distribution system×$Wp$+maximum value of voltage margin decrease on upper limit side at each point within responsible voltage control range for each transformer×$W1$+maximum value of voltage margin decrease on lower limit side at each point within responsible voltage control range for each transformer×$W1$+target voltage change of transformer from previous command×$W2$+transmission loss×$W3$ (2)

Note that the responsible voltage control range is defined for each of the voltage controllers of a transformer type, that is, for each transformer. The responsible voltage control range is a range or a section on the distribution line 4-1 or 4-2. The voltage controller assigned the range is responsible for controlling the voltage within that range. The responsible voltage control range typically extends from the position where the voltage controller assigned the range is installed to the next voltage controller disposed downstream of the voltage controller. Note that in the distribution line 4-1, the side on which the voltage controller 1 is disposed is defined as an upstream side, and a direction away from the voltage controller 1 is defined as a direction toward a downstream side. The voltage controller, which is next to no voltage controller disposed downstream thereof has the responsible voltage control range that extends to the end of the distribution line. Note that a method of setting the responsible voltage control range is not limited to this example. The maximum value of the voltage margin decrease on the upper limit side at each point within the responsible voltage control range is the voltage margin on the side of the upper limit among the voltage margins expressed by the above expression (1) at each point in the distribution system within the responsible voltage control range of each voltage controller. The maximum value of the voltage margin decrease on the lower limit side at each point within the responsible voltage control range is the voltage margin on the side of the lower limit among the voltage margins expressed by the above expression (1) at each point in the distribution system within the responsible voltage control range of each voltage controller.

Returning to the explanation of FIG. 5, the voltage distribution determination unit 23 determines whether or not a search, that is, a search in step S25 as will be described later, has been performed a certain number of times (step S24), and ends the processing if the search has been performed the certain number of times (Yes in step S24) or proceeds to processing in step S25 if the search has not been performed the certain number of times (No in step S24).

Next, in step S25, the voltage distribution determination unit 23 changes the control variable of each voltage controller by, for example, "one unit" to calculate the voltage at each point in the distribution system as in step S22 and evaluate the distribution system as in step S23. The voltage distribution determination unit 23 performs this processing for all the voltage controllers, compare evaluation results, and sets the control variable of the voltage controller such that the evaluation is improved the most (step S25). Changing the control variable by "one unit" means to raise or lower the tap position by one step in the case of the voltage controller of a transformer type, or to increase or decrease the amount of reactive power by a certain amount in the case of the voltage controller of a reactive power regulator type. Note that the storage 26 stores the control limit of each voltage controller as described above so that, in step S25, the voltage distribution determination unit 23 refers to the control limit and changes the control variable of each voltage controller within the range not exceeding the control limit. Any method such as a generally used method may be used as the optimization algorithm. The processing returns to step S24 after the execution of step S25.

As described above, after the certain number of searches, the voltage distribution determination unit 23 can determine the optimum voltage distribution of the distribution system in the future fixed time period and the optimum control variable of each voltage controller as the best solution for optimizing the value of the evaluation function.

Note that the method of centralized control by the centralized voltage control apparatus 8 is not limited to the above example, and may be any method for determining the control variable of each voltage controller such that a deviation of the voltage from the high-voltage proper voltage range is prevented at each point in the distribution system. For example, instead of making a prediction for the next day, the measured value of the voltages in the measured information provided by the individual measuring devices 10 may be used as a voltage distribution, and the optimum control variable may be calculated by performing the processing similar to that in steps S21 to S25 on the basis of the voltage distribution.

As described above, the high-voltage proper voltage range is determined at each point in the distribution system, and the centralized voltage control controls the control variable of each voltage controller to prevent a deviation of the voltage from the high-voltage proper voltage range at each point in the distribution system. A site where a measurement is not performed is excluded from the evaluation performed in calculating the optimum control variable in the above centralized voltage control. Therefore, no consideration is given as to a deviation of the voltage from the high-voltage proper voltage range at the site where a measurement is not performed. In order to prevent a deviation of the voltage from the high-voltage proper voltage range in the entire distribution system, it is desirable that the measuring devices 10 be installed at as many sites as possible. Meanwhile, since the measuring device 10 is installed on the distribution line of the high voltage system, the installation is not easy and also requires cost. In particular, the measuring device 10 currently planned to be installed is mainly a switch with a sensor. It possibly takes several decades to replace all the currently installed switches with switches with sensors.

Also, the measuring device 10 already installed may become unusable due to a failure or the like. Moreover, the system may be switched due to construction or the like, in which case the measuring device installed may become unusable. For example, assume that, in FIG. 1, the measuring device 10-4 has become unusable on the distribution line 4-1 due to system switching work or a failure of the measuring device 10-4 itself. When the measuring device 10-4 has become unusable, the amount of deviation of the voltage at the site where the measuring device 10-4 is installed is not reflected in the evaluation function described above, whereby the voltage at the site where the measuring device 10-4 is installed is not considered in the centralized voltage control. However, generally, a voltage drop increases on the downstream side of the distribution line. For this reason, the voltage may deviate from the high-voltage proper voltage range at the site of the measuring device 10-4 despite of the voltage falling within the high-voltage proper voltage range at the measurement point of the measuring device 10-3. Likewise, when any measuring device 10 other than the measuring device 10-4 has become unusable, the voltage may deviate from the high-voltage proper voltage range at the site where the measurement cannot be performed.

Figure 6:
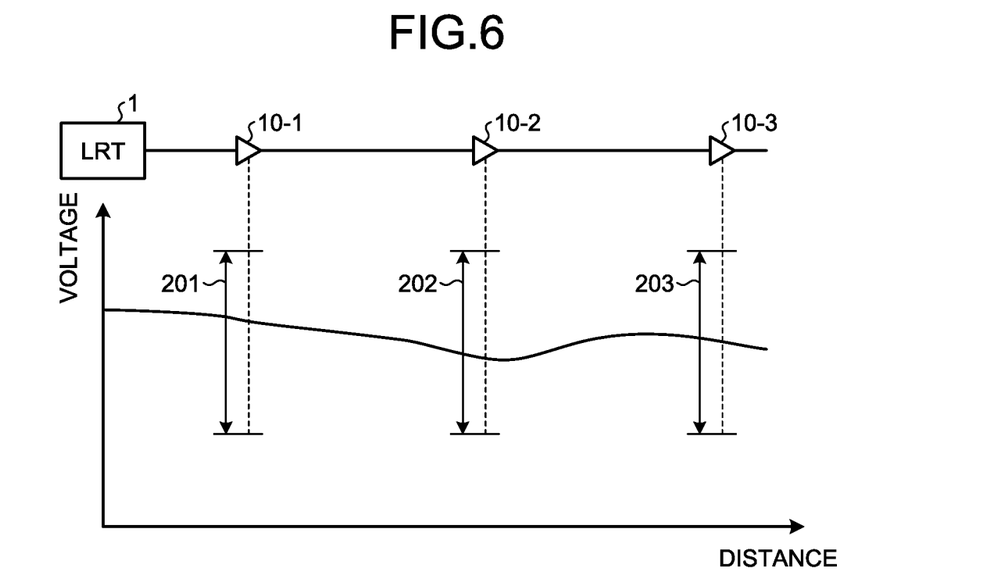
FIG. 6 is a graph illustrating an example of a change in voltage of a distribution line and a high-voltage proper voltage range.

FIG. 6 is a graph illustrating an example of a change in voltage of the distribution line 4-1 and the high-voltage proper voltage range. Ranges 201, 202, and 203 illustrated in FIG. 6 are the high-voltage proper voltage ranges at the three positions where the measuring devices 10-1, 10-2, and 10-3 are installed, respectively. In FIG. 6, the horizontal axis represents the distance from the voltage controller 1, and the vertical axis represents the voltage of the distribution line 4-1. Note that FIG. 6 illustrates the voltage and distance schematically and does not illustrate actual voltage and distance. The initial value of the high-voltage proper voltage range is determined such that, for example, the voltage at the receiving end of a typical customer connected to the low voltage distribution line can be maintained within the proper voltage range, as described above. Note that a tap ratio in converting the voltage of the high voltage system to the voltage of the low voltage system varies depending on the position on the distribution line 4-1 in some cases, whereby the initial values of the high-voltage proper voltage range may be set to different values depending on the different tap ratios and the different positions on the distribution line 4-1.

Figure 7:
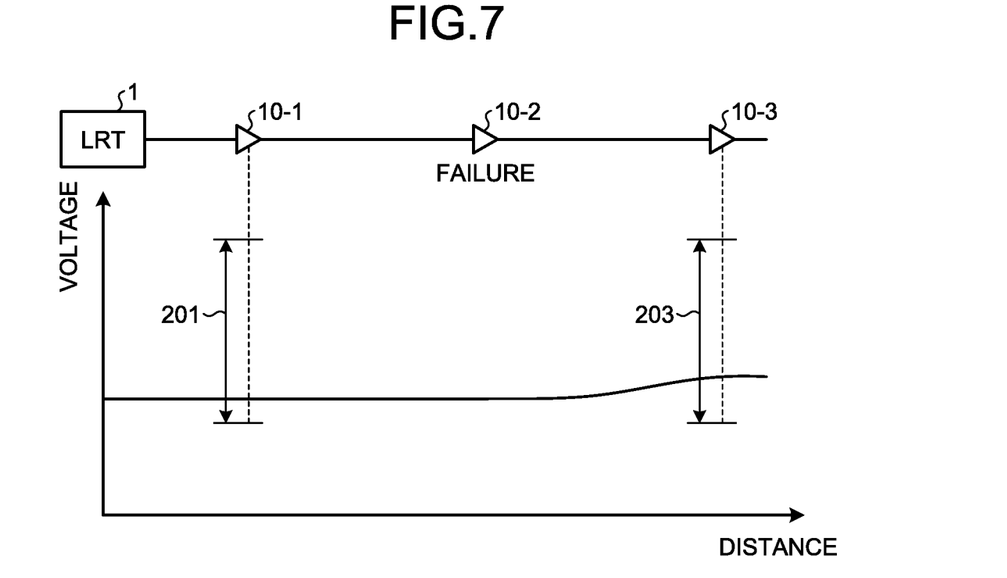
FIG. 7 is a graph illustrating an example of the high-voltage proper voltage range when a measuring device fails.

FIG. 7 is a graph illustrating an example of the high-voltage proper voltage range when the measuring device 10-2 fails. When the measuring device 10-2 has become unusable due to a failure or the like, as illustrated in FIG. 7, the centralized voltage control apparatus 8 controls the voltage controllers in such a manner as to prevent the voltages at the sites of the installation of the measuring devices 10-1 and 10-3 from deviating from the ranges 201 and 203. However, since no measured information can be obtained from the measuring device 10-2, the centralized voltage control apparatus 8 does not manage the voltage at the site of installation of the measuring device 10-2, which results in the same situation as the situation illustrated in FIG. 6 without the range 202 being not set.

In order to avoid such a problem, in the present embodiment, when the measuring device 10-2 has become unusable, the centralized voltage control apparatus 8 changes the high-voltage proper voltage range of the measuring device 10-1 that is the next measuring device disposed upstream of the measuring device 10-2. For example, the high-voltage proper voltage range of the measuring device 10-1 is changed to a value taking into consideration the maximum negative change and the maximum positive change in the voltage from the position where the measuring device 10-1 is installed to the position where the measuring device 10-3 is installed. Specifically, for example, an operator estimates a change in the voltage from the position where the measuring device 10-1 is installed to the position where the measuring device 10-3 is installed in consideration of past records, the wiring length, and the like, and then sets the changed high-voltage proper voltage range in the centralized voltage control apparatus 8 on the basis of a result of the estimation. Alternatively, the centralized voltage control apparatus 8 may estimate a change in the voltage in the above section on the basis of past measured information, and change the high-voltage proper voltage range on the basis of a result of the estimation. Yet alternatively, the centralized voltage control apparatus 8 may estimate a change in the voltage in the above section on the basis of the measured information obtained by the measuring device 10-3, and change the high-voltage proper voltage range on the basis of a result of the estimation. A method of estimating the change in the voltage will be described later.

Figure 8:
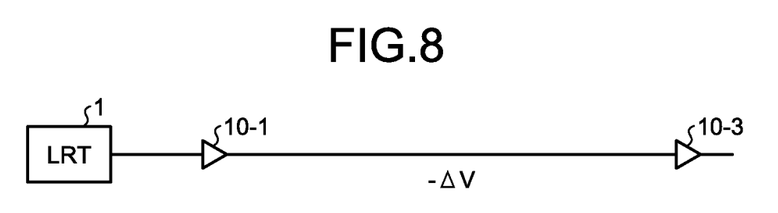
FIG. 8 is a diagram illustrating an example of an estimate of a change in voltage in an unmeasured section when the measuring device fails.

FIG. 8 is a diagram illustrating an example of an estimate of a change in the voltage in an unmeasured section when the measuring device 10-2 fails. FIG. 8 illustrates the example in which virtually no power generation facility is connected to the section from the position where the measuring device 10-1 is installed to the position where the measuring device 10-3 is installed. In the example of FIG. 8, a fluctuation in power consumed by a load predominates in a fluctuation in the voltage in this section. In such a case, when $\Delta V$ is the maximum voltage drop caused by the power consumed by the load in the section from the position where the measuring device 10-1 is installed to the position where the measuring device 10-3 is installed, the maximum negative change in this section is equal to $-\Delta V$. Therefore, even if the voltage at the site of the measuring device 10-1 is controlled such that the voltage is $V_a$, which is a voltage higher than the lower limit value of the range 201, the lowest possible voltage is $V_b = V_a - \Delta V$ in the section from the position where the measuring device 10-1 is installed to the position where the measuring device 10-3 is installed. As a result, when $V_b$ is converted to the low voltage system, the converted Vb may fall below the proper voltage range of the low voltage distribution line, that is, may deviate from the proper voltage range. In such a case, the present embodiment adds $\Delta V$ to the lower limit value of the range 201 corresponding to the measuring device 10-1, thereby preventing the voltage from falling below the proper voltage range of the low voltage distribution line even in the section from the position where the measuring device 10-1 is installed to the position where the measuring device 10-3 is installed.

Figure 9:
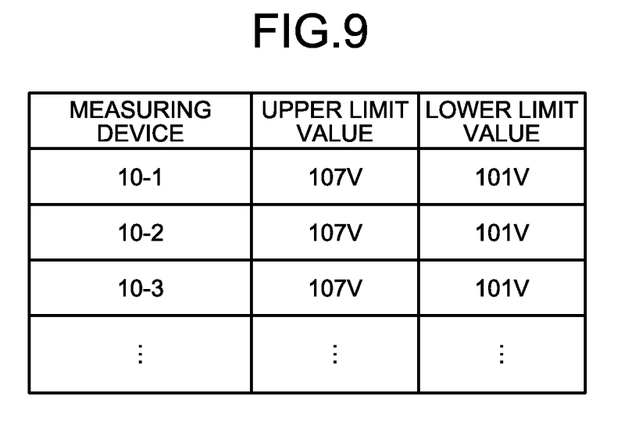
FIG. 9 is a table illustrating an example of initial values of proper range information stored in a storage of the centralized voltage control apparatus.

FIG. 9 is a table illustrating an example of initial values of the proper range information stored in the storage 26 of the centralized voltage control apparatus 8. The proper range information is, as described above, the information indicating the upper/lower limit values of the high-voltage proper voltage range at each measurement point in the distribution system. In the example illustrated in FIG. 9, the proper range information includes the upper limit value and the lower limit value for each measurement point in the distribution system, that is, for each measuring device 10. FIG. 9 is an example, and the configuration of the proper range information is not limited to the example illustrated in FIG. 9. In the example illustrated in FIG. 9, the initial values of the high-voltage proper voltage ranges corresponding to the measuring devices 10-1, 10-2, and 10-3 are all from 101 V to 107 V.

Figure 10:
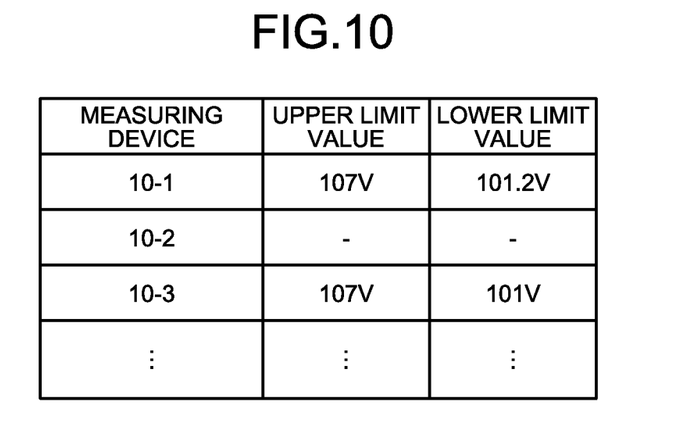
FIG. 10 is a table illustrating an example of the proper range information after the measuring device fails.

FIG. 10 is a table illustrating an example of the proper range information after the measuring device 10-2 fails. FIG. 10 illustrates the example in which, as illustrated in FIG. 8, $\Delta V$ is the maximum voltage drop caused by the power consumed by the load in the section from the position where the measuring device 10-1 is installed to the position where the measuring device 10-3 is installed, and estimated $\Delta V$ is 0.2 V. In this case, as illustrated in FIG. 10, the lower limit value corresponding to measuring device 10-1 is changed from 101 V to 101.2 V. Note that although, in FIG. 10, the upper limit value and the lower limit value corresponding to the measuring device 10-2 are denoted by sign "-" indicating that the upper limit value and the lower limit value corresponding to the measuring device 10-2 are not used in the centralized voltage control, the upper limit value and the lower limit value for the measuring device 10-2 in the proper range information may keep indicating those illustrated in FIG. 9.

Although the above example is described as to the change in voltage in the negative direction, a change in voltage in the positive direction, that is, a voltage rise, can also occur in a section having, for example, a power generation facility, or a static capacitor connected thereto. In such a case, the voltage rises the most in the section from the position where the measuring device 10-1 is installed to the position where the measuring device 10-3 is installed, when the voltage drop due to the load is the smallest and the voltage rise due to the power generation facility or the like is the largest. Moreover, the voltage drops the most in the section from the position where the measuring device 10-1 is installed to the position where the measuring device 10-3 is installed, when the voltage drop due to the load is the largest and the voltage rise due to the power generation facility or the like is the smallest.

Assume that $V_{Lmin}$ is an expected minimum value of the voltage drop due to the load, $V_{Lmax}$ is an expected maximum value of the voltage drop due to the load, $V_{Gmin}$ is an expected minimum value of the voltage rise due to the power generation facility or the like, and $V_{Gmax}$ is an expected maximum value of the voltage rise due to the power generation facility or the like. Also, assume that $V_{Lmin}$ and $V_{Lmax}$ are absolute values of the amount of voltage drop. At this time, in the section from the position where the measuring device 10-1 is installed to the position where the measuring device 10-3 is installed, a maximum positive voltage change $V_p$ and a maximum negative voltage change $V_m$ can be expressed by the following expressions (3) and (4), respectively.

$$V_p = V_{Lmin} + V_{Lmin} + V_{Gmax} \tag{3}$$

$$V_m = -V_{Lmax} + V_{Gmin} \tag{4}$$

At this time, assuming that $V_{UP}$ and $V_{LW}$ are the initial values of the upper limit value and the lower limit value of the high-voltage proper voltage range corresponding to the measuring device 10-1, respectively, the upper limit value is changed to $V_{UP} - V_p$, and the lower limit value is changed to $V_{LW} - V_m$. Note that the upper limit value is not changed when $V_p$ is negative, and the lower limit value is not changed when $V_m$ is positive.

Moreover, although the above example treats, as one section, the section from the position where the measuring device 10-1 is installed to the position where the measuring device 10-3 is installed and estimates the change in voltage in this section, the section from the position where the measuring device 10-1 is installed to the position where the measuring device 10-3 is installed, that is, the section where no measuring device is installed, may be divided into a plurality of sections, and a change in voltage in each of the divisions may be estimated. In this case, the upper limit value and the lower limit value of the high-voltage proper voltage range of the measuring device 10-1 are changed in consideration of the change in voltage in each division.

Figure 11:
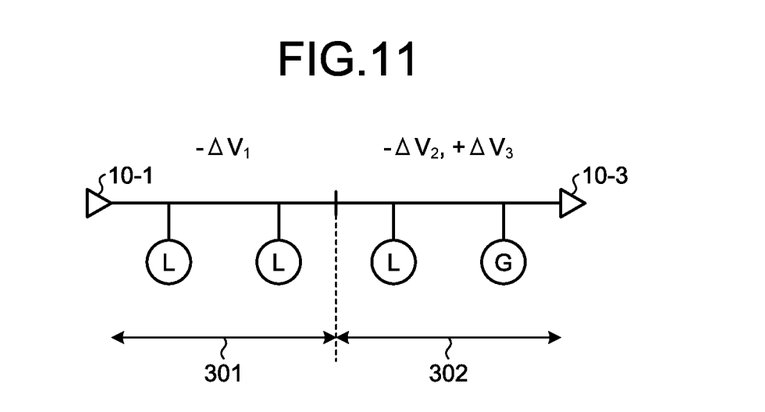
FIG. 11 is a diagram illustrating an example of an estimated result of a change in voltage in each of two divisions of an unmeasured section.

FIG. 11 is a diagram illustrating an example of an estimated result of a change in voltage in each of two divisions of an unmeasured section. In FIG. 11, a circled L indicates a load, and a circled G indicates a power generation facility. In the example illustrated in FIG. 11, the section from the position where the measuring device 10-1 is installed to the position where the measuring device 10-3 is installed is divided into a section 301 and a section 302. In the example illustrated in FIG. 11, the above-described $V_m$ in the section 301 is $-\Delta V_1$, the above-described $V_m$ in the section 302 is $-\Delta V_2$, and the above-described $V_p$ in the section 302 is $\Delta V_3$ ($+\Delta V_3$). Note that $V_p$ is not shown in the section 301 because $V_p$ in the section 301 is negative, that is, virtually no voltage rise due to a power generation facility or the like in the section 301 occurs. In such a case, the high-voltage proper voltage range corresponding to the measuring device 10-1 has the upper limit value changed to $V_{UP} - \Delta V_3$ and the lower limit value changed to $V_{LW} + \Delta V_1 + \Delta V_2$.

Next, a method of estimating a change in voltage in an unmeasured section will be described. As described above, a method of estimating a change in voltage in an unmeasured section may be a method performed by an operator on the basis of the information on, for example, the facility connected to the section, and the length of the distribution line. Alternatively, information such as the information on, for example, the facility connected to the section and the length of the distribution line is stored in the centralized voltage control apparatus 8, and the upper/lower limit management unit 25 of the centralized voltage control apparatus 8 uses the information to estimate the change in voltage in the unmeasured section in accordance with a predetermined calculation formula. Also, when the measuring device 10 installed fails as illustrated in FIG. 7, another method can be used, wherein the upper/lower limit management unit 25 estimates the change in voltage in the unmeasured section, using a result of measurement obtained by the measuring device 10 before the failure.

It is also conceivable that the upper/lower limit management unit 25 estimates the change in voltage in the unmeasured section, using the measured information obtained by the measuring device 10. For example, when the section from the position where the measuring device 10-1 is installed to the position where the measuring device 10-3 is installed is not measured as illustrated in FIG. 7, a change in voltage in the unmeasured section is estimated using the result of measurement of the active power and the result of measurement of the reactive power among the measured information obtained by the measuring devices 10-1 and 10-3. Assume that a value "P" is a value obtained by subtracting the active power measured by the measuring device 10-1 from the active power measured by the measuring device 10-3, and a value "Q" is a value obtained by subtracting the reactive power measured by the measuring device 10-1 from the reactive power measured by the measuring device 10-3. At this time, a change in voltage $\Delta V$ from the position where the measuring device 10-1 is installed to the position where the measuring device 10-3 is installed can be expressed by the following expression (5). Note that a character "R" represents the resistance of the distribution line, and a character "X" represents the reactance of the distribution line.

$$\Delta V = P \cdot R + Q \cdot X \tag{5}$$

The values "R" and "X" are determined by the positions where the load, the power generation facility, and the like are connected. Assuming these positions are determined, the change in voltage can be estimated in accordance with the above expression (5). Note that the change in voltage may be calculated in accordance with the above expression (5) by treating, as one load, the loads connected to the section and assuming the center of the loads. Alternatively, the change in voltage may be calculated by assuming that the load is connected to each of a plurality of positions and distributing the active power and the reactive power to each load. The similar applies to the power generation facilities. Any method may be used for distributing the active power and the reactive power. Note that although the above description is made as to the example in which the change in voltage in the unmeasured section is estimated on the basis of the active power and the reactive power, the change in voltage in the unmeasured section may be estimated on the basis of the active power. In this case, the value "Q" in the above expression (5) is determined by, for example, a predetermined power factor and the value "P".

Note that the voltage in the unmeasured section may change depending on the time of day. For example, a voltage change due to power generation by solar power generation equipment depends on the time of day. Therefore, estimating the change in voltage in the unmeasured section for each time of day can increase the accuracy of estimating the voltage change. In this case, the high-voltage proper voltage range corresponding to the measuring device 10 disposed upstream of the unmeasured section is changed for each time of day. Moreover, the power consumption by the load may change depending on the day of the week. Therefore, the change in voltage in the unmeasured section may be estimated for each day of the week, for example, for each of holiday and weekday. In this case as well, the high-voltage proper voltage range corresponding to the measuring device 10 disposed upstream of the unmeasured section is changed for each of the holiday and the weekday.

Moreover, in recent years, a smart meter that is an automated meter reading device has been widely used by customers. The change in voltage in the unmeasured section may be estimated using a result measured by the smart meter. For example, the smart meter called an all-quantity buyback smart meter measures the amount of power generated by solar power generation equipment. Thus, the centralized voltage control apparatus 8 may acquire a measured value of the all-quantity buyback smart meter from a management device that manages measured values of the smart meter, obtain past power generation from the measured value of the all-quantity buyback smart meter, and estimate the change in voltage in the unmeasured section, using the power generation obtained.

The above description is described as to the example in which the unmeasured section occurs due to the installed measuring device 10 installed being unusable. The present invention is not limited to such a case, and may treat, as the unmeasured section, a site where no measuring device 10 is installed, and change the high-voltage proper voltage range at a site where a measurement is performed, from the initial value. As a result, it becomes possible to prevent a deviation of voltage from the high-voltage proper voltage range in the section where no measuring device is installed. As described above, it is expected to take time before a large number of the measuring devices 10 are installed. When a small number of the measuring devices 10 are installed, there is a possibility in practice that a deviation from the high-voltage proper voltage range occurs in the unmeasured section. In order to avoid such a situation, as with the method described above, a change in voltage in a section where no measuring device is installed is estimated, and the high-voltage proper voltage range corresponding to the measuring device 10 disposed upstream of the section is changed on the basis of a result of the estimation. As a result, it becomes possible to prevent a deviation from the high-voltage proper voltage range as well as to reduce the number of the installed measuring devices 10.

Moreover, it is difficult to predict a change in voltage in places, for example, where a large number of solar power generation equipment with large temporal fluctuations are installed, whereas it is easy to predict a change in voltage in places where temporal changes in the voltage are small. Therefore, the measuring device 10 can be preferentially installed where the temporal changes in voltage are expected to be large, and the high-voltage proper voltage range for the measuring device 10 installed on the upstream side of a place where the temporal changes in voltage are small can be changed in advance as described in the present embodiment instead of installing the measuring device in that place. Accordingly, the number of the measuring devices 10 installed can be reduced, and the cost of installing the measuring devices 10 can be reduced.

Note that although the above description is made as to the example in which the high-voltage proper voltage range corresponding to the measuring device 10 disposed upstream of and closest to the unmeasured section is changed, the high-voltage proper voltage range corresponding to the measuring device 10 disposed further upstream may be changed. That is, at least a part of the proper voltage range at each measurement point may be determined on the basis of an estimated value of the change in voltage in the section where the voltage is not measured on the distribution line.

As described above, in the present embodiment, a change in voltage in the section not measured by the measuring device 10 is reflected in the high-voltage proper voltage range at the measurement point measured by the measuring device 10. As a result, a deviation of the voltage from the proper voltage range can be prevented.

The configuration illustrated in the above embodiment merely illustrates an example of the content of the present invention, and can thus be combined with another known technique or partially omitted and/or modified without departing from the scope of the present invention.

REFERENCE SIGNS LIST 1, 5, 6 voltage controller; 2 bus; 3-1, 3-2 circuit breaker; 4-1, 4-2 distribution line; 8 centralized voltage control apparatus; 9 communication network; 10-1 to 10-8 measuring device; 11, 15, 16 local voltage control device; 20 control section; 21 load/power generation amount predicting unit; 22 correction unit; 23 voltage distribution determination unit; 24 tap position determination unit; 25 upper/lower limit management unit; 26 storage; 27 transceiver.

The invention claimed is:
1. A centralized voltage control apparatus connected via a communication network to a plurality of local voltage control devices to control, in a one-to-one correspondence, a plurality of voltage controllers to control voltage of a distribution line of a distribution system, the voltage controllers being connected to the distribution line, the centralized voltage control apparatus comprising:
calculation circuitry to calculate a control variable for each of the plurality of voltage controllers on the basis of a measured value of voltage at each measurement point of the distribution line at which a measuring device is installed and a proper voltage range at each measurement point; and
command circuitry to give a command value to each of the plurality of local voltage control devices on the basis of the control variable, wherein
the measuring device measures active power,
when a measurement becomes impossible at a first measurement point that is the measurement point, the calculation circuitry calculates an estimated value of a change in voltage of the distribution line for a section between a second measurement point that is the measurement point located upstream of the first measurement point and a third measurement point that is the measurement point located downstream of the first measurement point, using the measured active power, and changes the proper voltage range at the second measurement point on the basis of the estimated value, and wherein the command circuitry gives a command value that is determined in accordance with the changed proper voltage range.

2. The centralized voltage control apparatus according to claim 1, wherein the measuring device further measures active power and reactive power, and the centralized voltage control apparatus calculates the estimated value, using the active power and the reactive power measured by the measuring device.

3. The centralized voltage control apparatus according to claim 1, wherein the measuring device is a switch with a sensor.

4. A centralized voltage control apparatus connected via a communication network to a plurality of local voltage control devices to control, in a one-to-one correspondence, a plurality of voltage controllers to control voltage of a distribution line of a distribution system, the voltage controllers being connected to the distribution line, the centralized voltage control apparatus comprising:

calculation circuitry to calculate a control variable for each of the plurality of voltage controllers on the basis of a measured value of voltage at each measurement point of the distribution line and a proper voltage range at each measurement point; and command circuitry to give a command value to each of the plurality of local voltage control devices on the basis of the control variable, wherein when a measurement becomes impossible at a first measurement point that is the measurement point, the calculation circuitry calculates an estimated value of a change in voltage of the distribution line for a section between a second measurement point that is the measurement point located upstream of the first measurement point and a third measurement point that is the measurement point located downstream of the first measurement point, on the basis of a result of measurement by a smart meter, and changes the proper voltage range at the second measurement point on the basis of the estimated value, and wherein the command circuitry gives a command value that is determined in accordance with the changed proper voltage range.

5. A centralized voltage control system comprising:

a plurality of voltage controllers to control voltage of a distribution line of a distribution system, the voltage controllers being connected to the distribution line;

a plurality of local voltage controllers to control, in a one-to-one correspondence, the plurality of voltage controllers;

a centralized voltage control apparatus connected to the plurality of local voltage controllers via a communication network; and a measuring circuit to measure active power of the distribution line, wherein the centralized voltage control apparatus includes:

calculation circuitry to calculate a control variable for each of the plurality of voltage controllers on the basis of a measured value of active power at each measurement point measured by the measuring circuit and a proper voltage range at each measurement point; and command circuitry to give a command value to each of the plurality of local voltage controllers on the basis of the control variable, and when a measurement becomes impossible at a first measurement point that is the measurement point, the calculation circuitry calculates an estimated value of a change in voltage of the distribution line for a section between a second measurement point that is the measurement point located upstream of the first measurement point and a third measurement point that is the measurement point located downstream of the first measurement point, using the measured active power, and changes the proper voltage range at the second measurement point on the basis of the estimated value, and wherein the command circuitry gives a command value that is determined in accordance with the changed proper voltage range.

* * * * *